(12) United States Patent
Yu et al.

(10) Patent No.: US 8,014,141 B2
(45) Date of Patent: Sep. 6, 2011

(54) PORTABLE ELECTRONIC DEVICE AND COMPUTER WITH WRITING TABLET

(75) Inventors: Hai-Yang Yu, Shenzhen (CN); Hong-Wei Zhu, Shenzhen (CN); Er-Zheng Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 99 days.

(21) Appl. No.: 12/545,877

(22) Filed: Aug. 24, 2009

(65) Prior Publication Data

US 2010/0128428 A1  May 27, 2010

(30) Foreign Application Priority Data

Nov. 25, 2008 (CN) .......................... 2008 1 0305711

(51) Int. Cl.
*H05K 7/16* (2006.01)
(52) U.S. Cl. ............... 361/679.27; 361/679.01; 248/917
(58) Field of Classification Search .................. 361/679, 361/679.02, 679.27, 679.18, 679.16, 679.26, 361/679.23, 679.04–679.08, 724–727, 679.01; 248/917–924
See application file for complete search history.

(56) References Cited

U.S. PATENT DOCUMENTS

| 5,900,848 | A  | * | 5/1999 | Haneda et al. ................. 345/1.1 |
| 6,259,597 | B1 | * | 7/2001 | Anzai et al. ............... 361/679.55 |
| 6,700,773 | B1 | * | 3/2004 | Adriaansen et al. ...... 361/679.08 |
| 7,576,975 | B2 | * | 8/2009 | Tai et al. ................... 361/679.21 |

FOREIGN PATENT DOCUMENTS

JP  06208425 A  *  7/1994

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device includes a main body, a display and a writing tablet. The display pivotally connects to a rear wall of the main body to selectively locate in a first state and a second state. In the first state, the display covers a top wall of the main body. In the second state, the display rotates away from the top wall and is arranged on a rear side of the main body. The writing tablet pivotally connects to the main body to selectively locate at a first position and a third position. In the first position, the writing tablet is arranged between the display and the main body and covers the top wall of the main body, and electrically connected with the main body for receiving input signals. In the third position, the writing tablet is arranged on a front side of the main body.

10 Claims, 8 Drawing Sheets

PORTABLE ELECTRONIC DEVICE AND COMPUTER WITH WRITING TABLET

BACKGROUND

1. Technical Field

The present disclosure relates to portable electronic devices, and particularly to a portable electronic device with a writing tablet.

2. Description of Related Art

A conventional notebook computer includes a main body for accommodating core components, such integrated circuits (ICs), and a lid pivotally connected to the main body. The notebook computer also has a keyboard mounted on the main body and a pointing device. Both the keyboard and the pointing device are electrically connected with the core components to be used as input devices for the notebook computer. However, the above described input devices do not have similarity with conventional writing apparatus, thus they are not suited to be used for character inputs.

Therefore, a portable electronic device with a writing tablet is desired.

DETAILED DESCRIPTION

Figure 1:
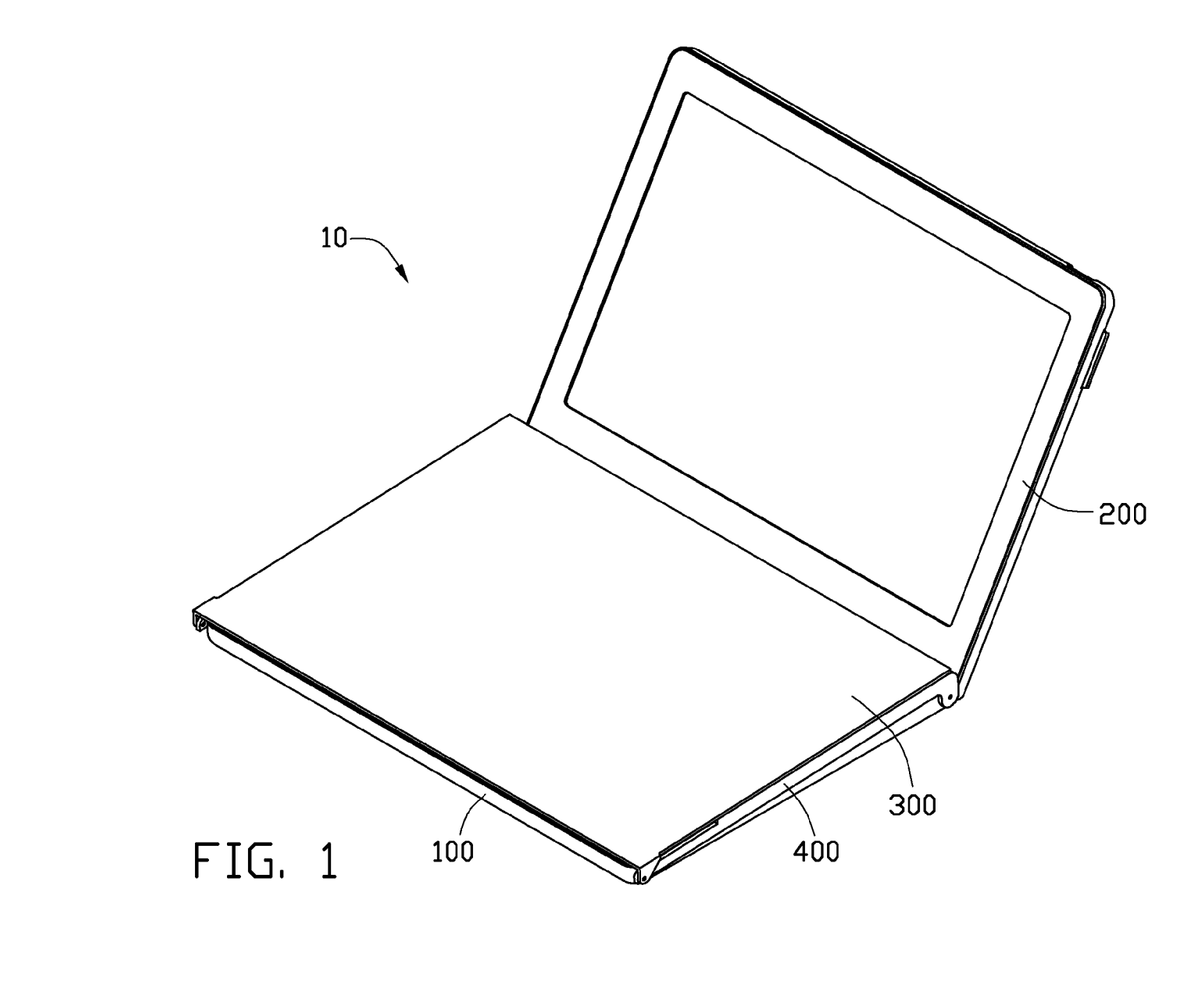
FIG. 1 is an isometric view of a portable electronic device, having a main body and a lid rotatable with respect to the main body, with a writing tablet covering the main body, in accordance with an exemplary embodiment.

Referring to FIG. 1, a portable electronic device 10 may be a notebook computer. The portable electronic device 10 includes a main body 100, a display 200 pivotally connected to the main body 100, a writing tablet 300, two connecting rods 400 rotatably connecting the writing tablet 300 with the main body 100. The main body 100 accommodates core components of the portable electronic device 10, such as integrated circuits (ICs), integrated processing chips, etc.

Figure 2:
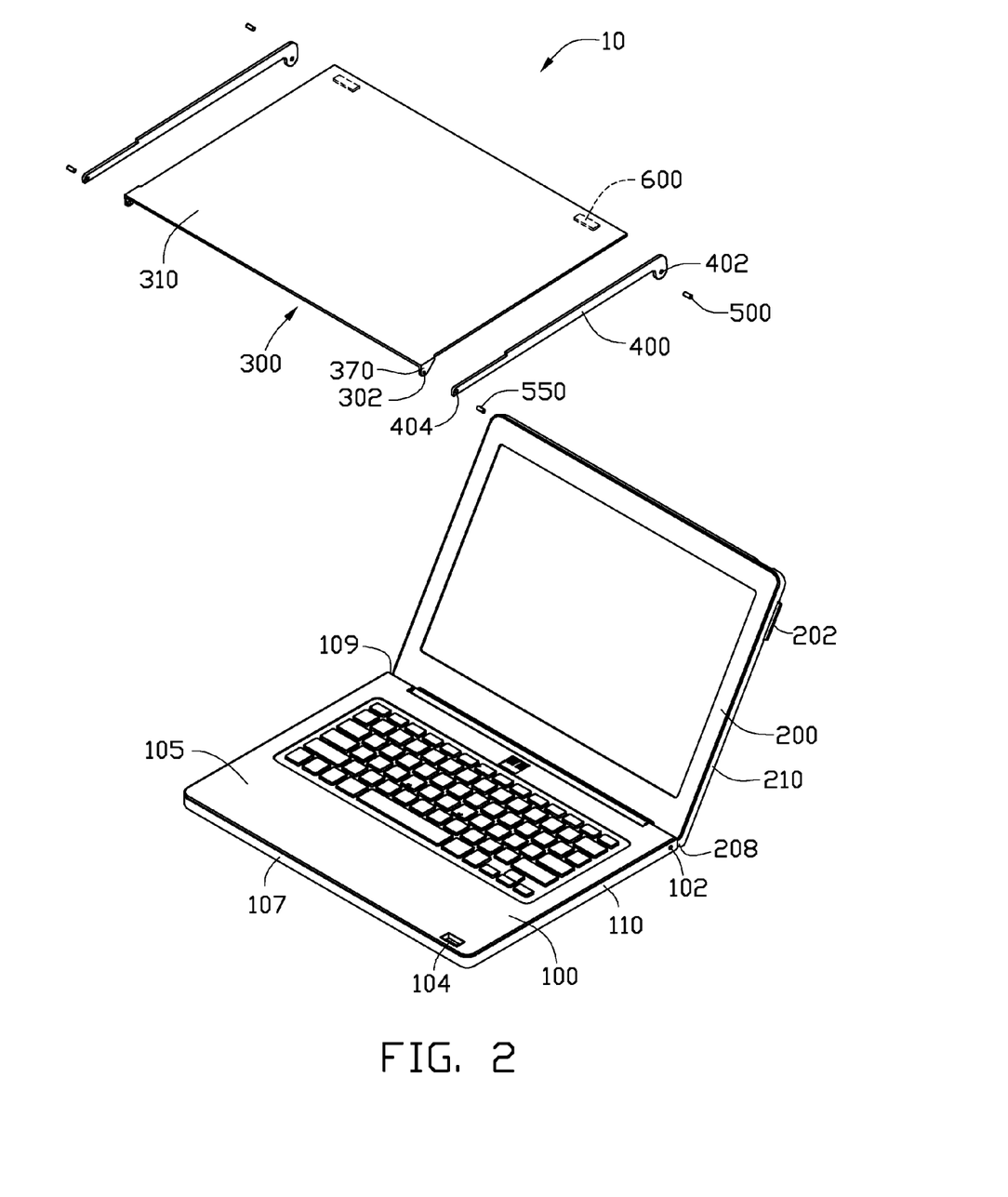
FIG. 2 is an exploded view of the portable electronic device in FIG. 1.
Figure 3:
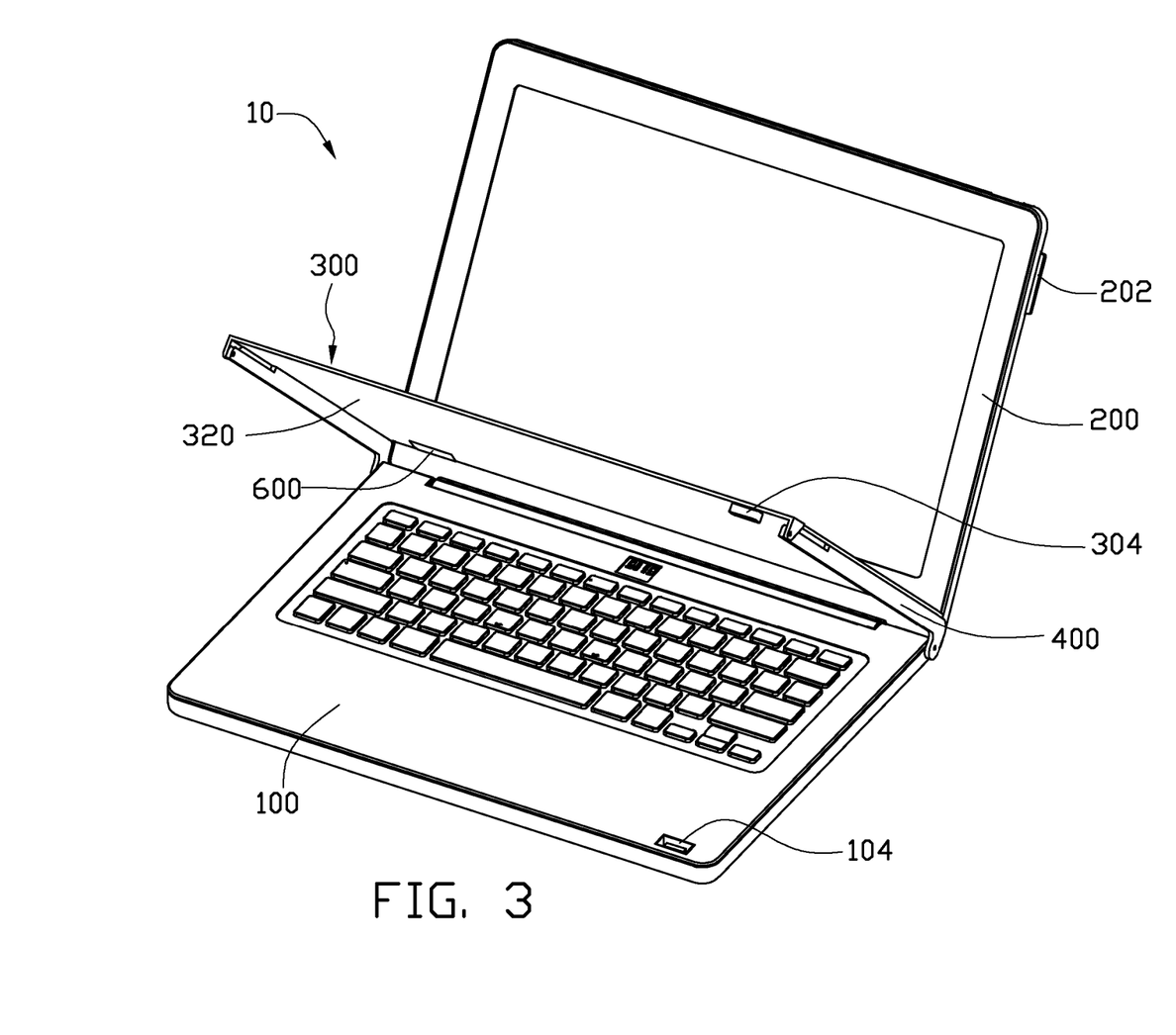
FIG. 3 is a schematic view of the portable electronic device in FIG. 1 with the writing tablet rotating relative to the main body in a first direction from one perspective.
Figure 4:
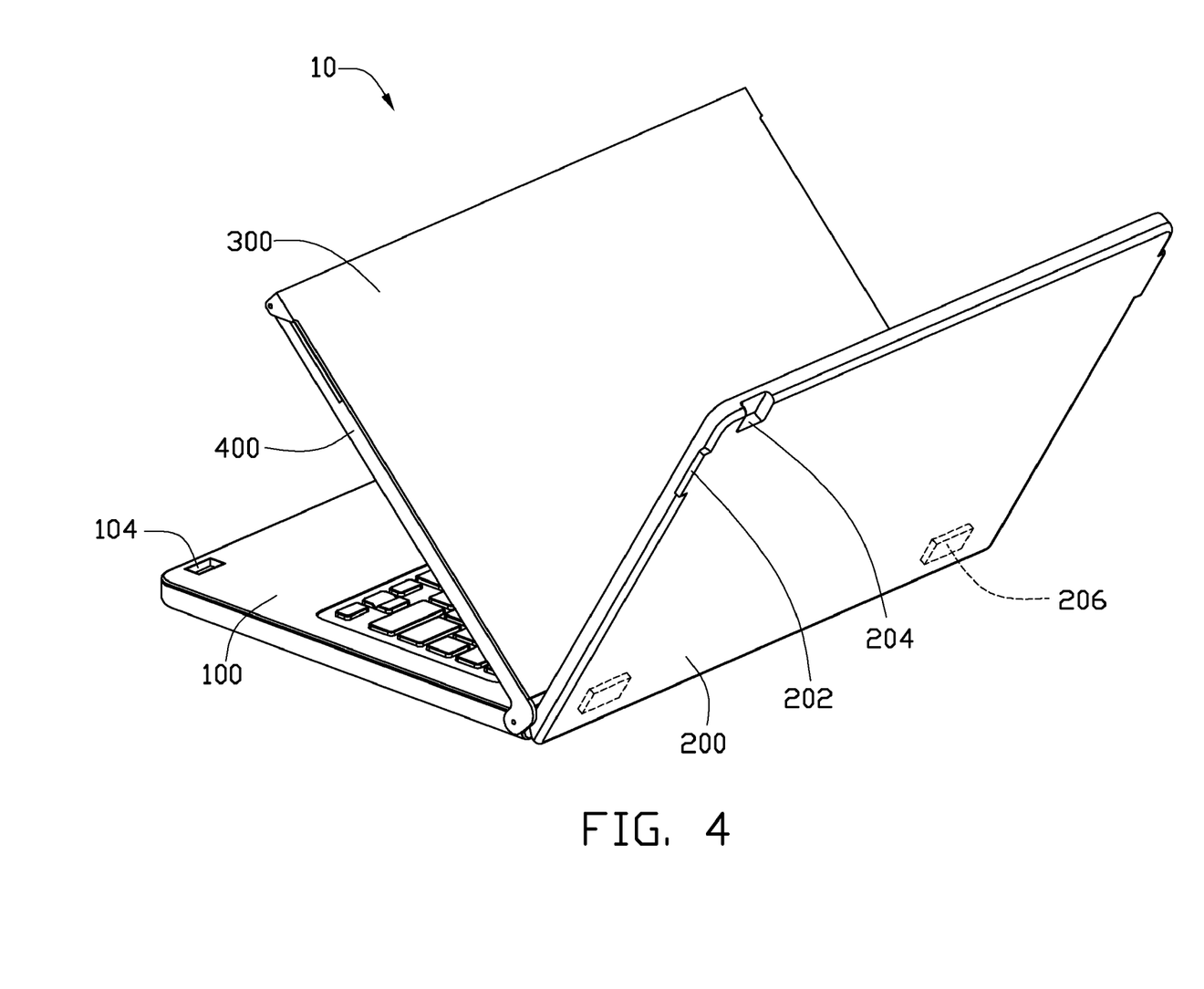
FIG. 4 is a schematic view of the portable electronic device in FIG. 3 from another perspective.

Referring to FIGS. 2 to 4, both of the main body 100 and the display 200 may be rectangular. The main body 100 has a top wall 105, a front wall 107, a rear wall 109, and two first sidewalls 110. The two first sidewalls 110 are on opposite sides of the main body 100 and connect between the front wall 107 and the rear wall 109.

The display 200 is attached to the rear wall 109 and rotatable with respect to the main body 100, thus the display 200 is changeable between a first state and a second state. In the first state, the display 200 covers the main body 100 and contacts the top wall 105. In the second state, the display 200 is rotated away from the top wall 105.

The main body 100 defines two shaft holes 102 in the two first sidewalls 110, respectively. The shaft holes 102 are adjacent to the rear wall 109 correspondingly. A jack 104 is disposed in the top wall 105 and adjacent to the front wall 107.

The display 200 has a lower wall 208 and two second sidewalls 210 on opposite sides of the 200 connected with the lower wall 208. The lower wall 208 is adjacent to the rear wall 109. Two protrusions 202 are arranged on the second sidewalls 210, respectively. The two protrusions 202 extend from an end of each of the second sidewalls 210 away from the lower wall 208. The display 200 defines a receiving portion 204 in one end of the display 200 away from the lower wall 208. Two first magnetic bodies 206 are arranged on another end of the display 200 adjacent to the lower wall 208.

The writing tablet 300 may be have a similar shape with the main body 100. For example, the writing tablet 300 is a rectangular sheet. The writing tablet 300 includes two surfaces, i.e., a first surface 310, and a second surface 320 on opposite sides of the 300. The first surface 310 acts as an input surface for receiving input operations.

Two baffles 370 protrude perpendicularly from the writing tablet 300 away from the first surface 310. The two baffles 370 are located at one side of the writing tablet 300. Each baffle 370 defines a through hole 302. A plug 304 corresponding to the jack 104 is arranged on the second surface 320.

Two second magnetic bodies 600 may have a similar shape with the first magnetic bodies 206. The two second magnetic bodies 600 are located at another side of the writing tablet 300 opposite to the two baffles 370.

The lengths of the connecting rods 400 are a little longer than those of the first sidewall 110 and the second sidewall 210. A through hole 402 and a shaft hole 404 are defined on opposite ends of each connecting rod 400.

In assembly, the shafts 500 are passed through the through holes 402 and the shaft holes 102 correspondingly to pivotally connected the two connecting rods 400 with the main body 100. Then the shafts 550 are passed through the two through holes 302 and inserted into the shaft holes 404 correspondingly, thus the writing tablet 300 pivotally connects with the two connecting rods 400 to selectively locate in a first position, a second position and a third position. The two connecting rods 400 are between the two baffles 370.

When the writing tablet 300 locates at a first position (referring to FIG. 1), the writing tablet 300 is between the main body 100 and the display 200. The writing tablet 300 covers the main body 100, and the second surface 320 faces the main body 100. The first side walls 110 are between the two connecting rods 400 and adjacent to the two connecting rods 400 correspondingly. The plug 304 is inserted into the jack 104 to electrically connect the writing tablet 300 with the main body 100, thus the writing tablet 300 can generate input signals based on received input operations and transmit the input signals to the main body 100. The writing tablet 300 has similarity with conventional writing implements, thus the portable electronic device 10 with the writing tablet 300 is suited to be used for character inputs. In addition, the size of the writing tablet 300 is not limited by size of the main body 100, and the writing tablet 300 can be designed in sizes satisfying various requirements of users.

Figure 6:
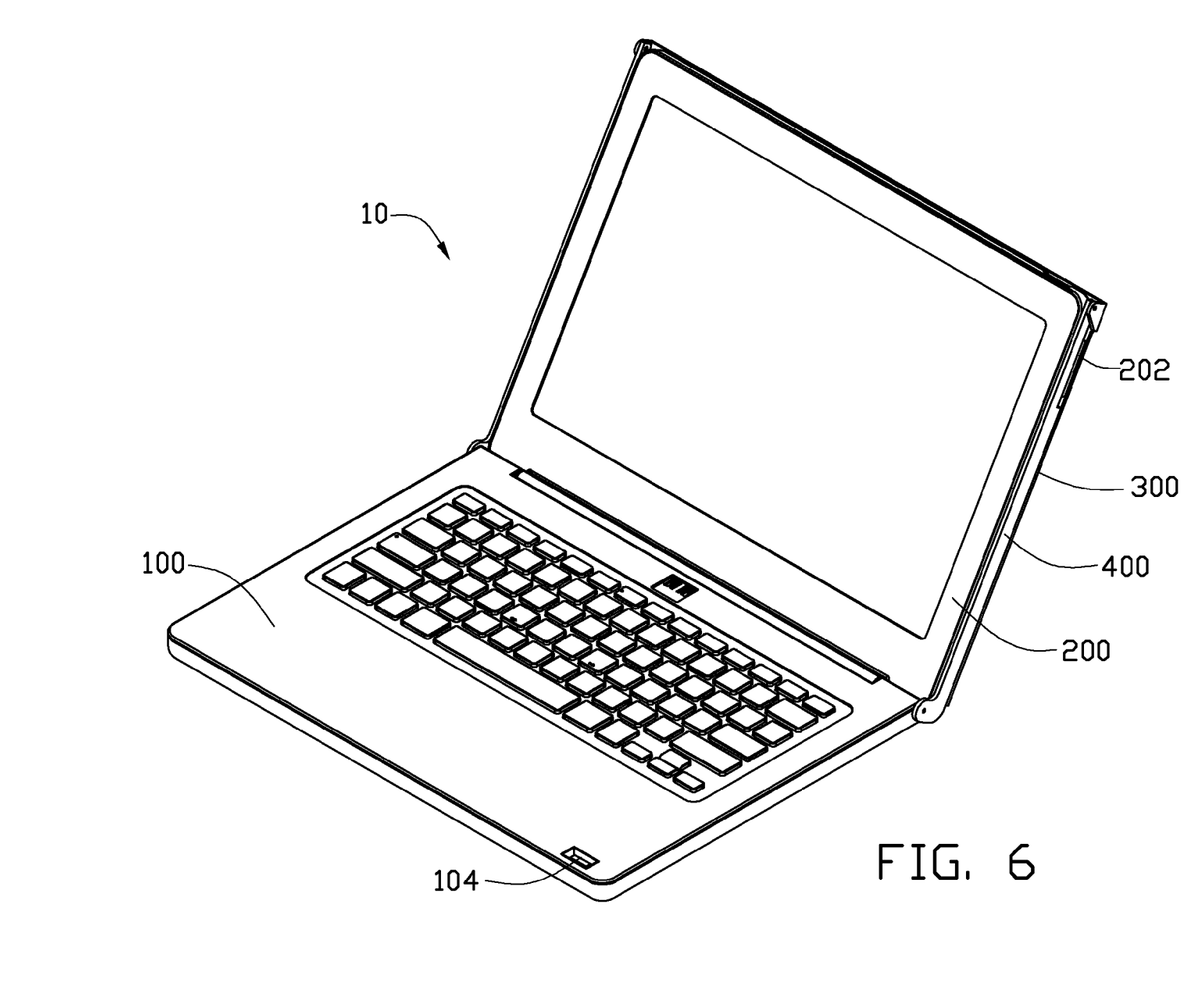
FIG. 6 is a schematic view of the portable electronic device in FIG. 5 with the writing tablet covering the back of the lid.
Figure 7:
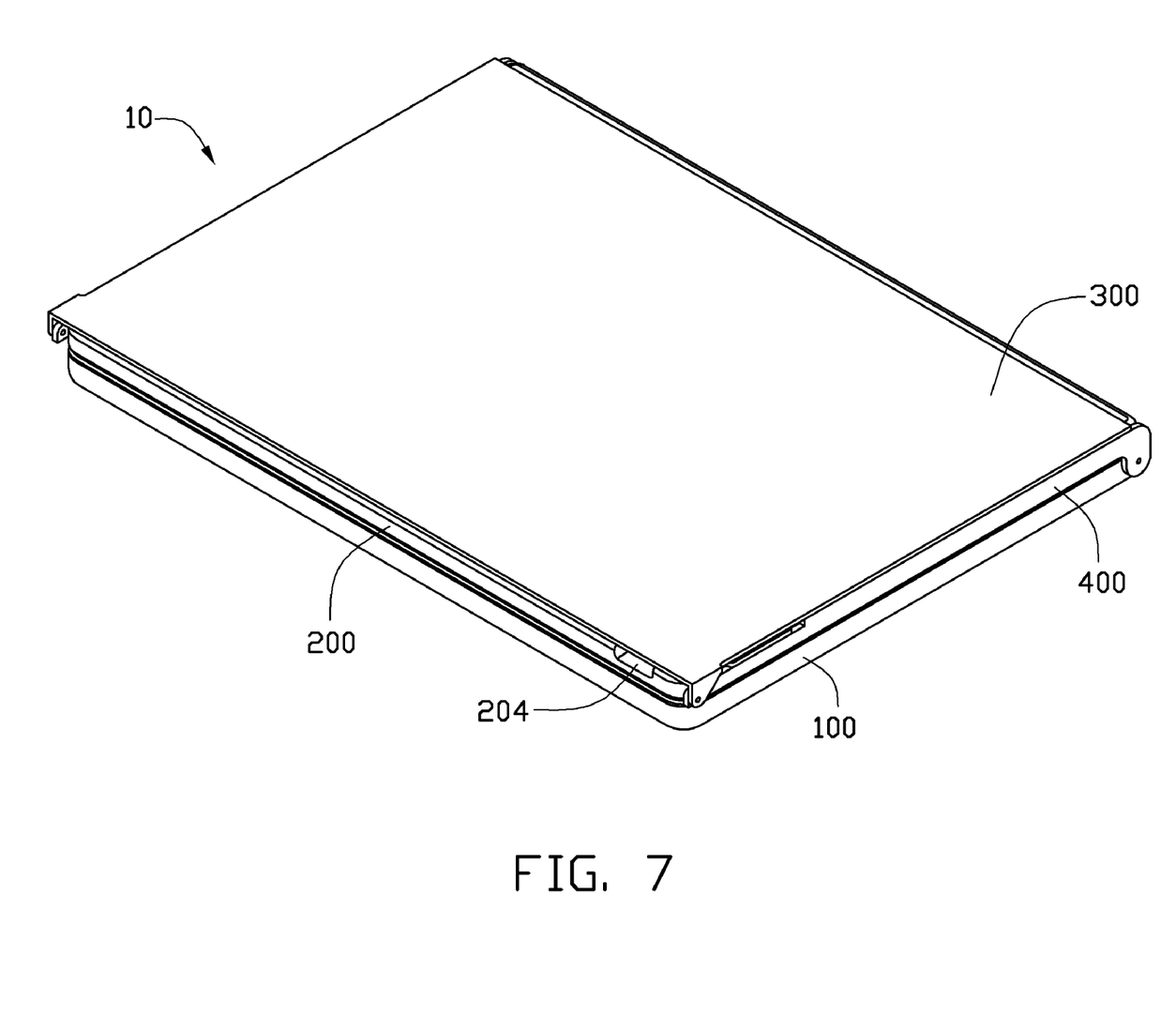
FIG. 7 is a schematic view of the portable electronic device in FIG. 6 when the lid covers the main body after the lid rotates relative to the main body.

When the writing tablet 300 locates at a second position (referring to FIGS. 6 and 7), The display 200 is between the writing tablet 300 and the main body 100. The writing tablet 300 covers the display 200, and the second surface 320 faces the display 200. The second side walls 210 are between the two connecting rods 400 and adjacent to the two connecting rods 400 correspondingly. The plug 304 is received in the receiving portion 204. The two first magnetic bodies 206 face the second magnetic bodies 600, and attract with the two second magnetic bodies 600 correspondingly, thus the writing tablet 300 covers on the display 100 stably.

When the writing tablet 300 locates at a third position (referring to FIG. 8), the writing tablet 300 is arranged on the side of the front wall 107 away from the rear wall 109, thus the top wall 105 of the main body 100 is exposed. The second surface 320 is above the first surface 310. The first side walls 110 are between the two connecting rods 400 and adjacent to the two connecting rods 400 correspondingly. The writing tablet 300 and the display 200 are arranged at opposite sides of the main body 100 when the display is in the second state.

In use, to change the writing tablet 300 from the first position to the second position, a first external force is applied on the writing tablet 300 at the side of the baffles 370, rotating the writing tablet 300 and driving the two connecting rods 400 to rotate away from the main body 100 to between the main body 100 and display 200 (referring to FIGS. 3 and 4).

Then, a second external force is applied on the another side of the writing tablet 300 at the side of the second magnetic bodies 600, the writing tablet 300 rotates away from the two connecting rods 400. Afterward, the writing tablet 300 rotates and drives two connecting rods 400 to rotate until that the writing tablet 300 is over the display 200 (referring to FIG. 5). As a result, the second side walls 210 are between the two connecting rods 400 and adjacent to the two connecting rods 400 correspondingly. Furthermore, two protrusions 202 block the two connecting rods 400 to limit the rotation of the two connecting rods 400 correspondingly.

Figure 5:
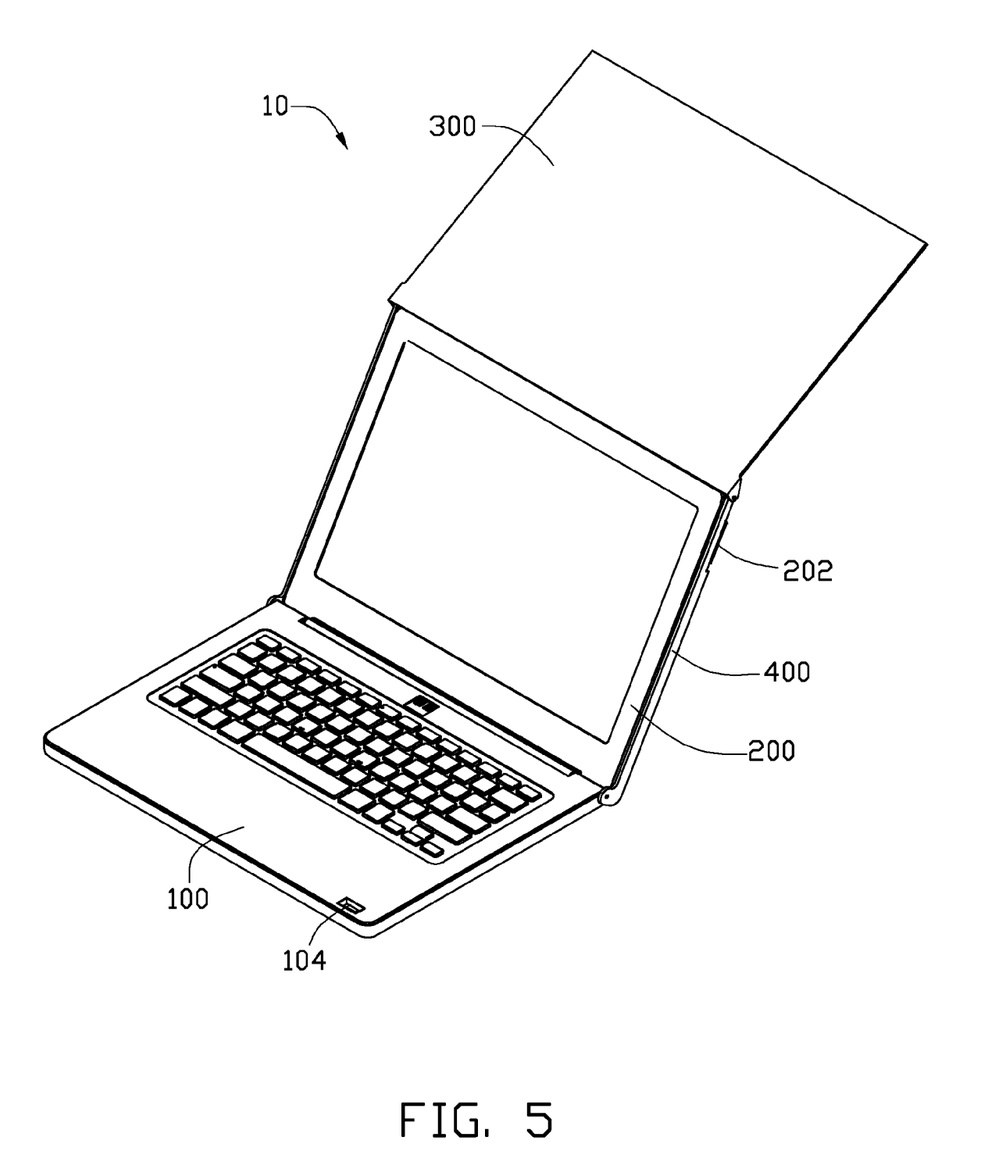
FIG. 5 is a schematic view of the portable electronic device in FIG. 3 after the writing tablet turns over and further rotates until the writing tablet over the lid.

Finally, the writing tablet 300 continues to rotate relative to the connecting rod 400 until the writing tablet 300 covers the display 200. The plug 304 is received in the receiving portion 204. The two first magnetic bodies 206 face the two second magnetic bodies 600, and attract the two second magnetic bodies 600 correspondingly. The display 200 is between the writing tablet 300 and the main body 100. The writing tablet 300 covers the display 200 and the second surface 320 faces the display 200, i.e., the writing tablet 300 is in the second position.

Figure 8:
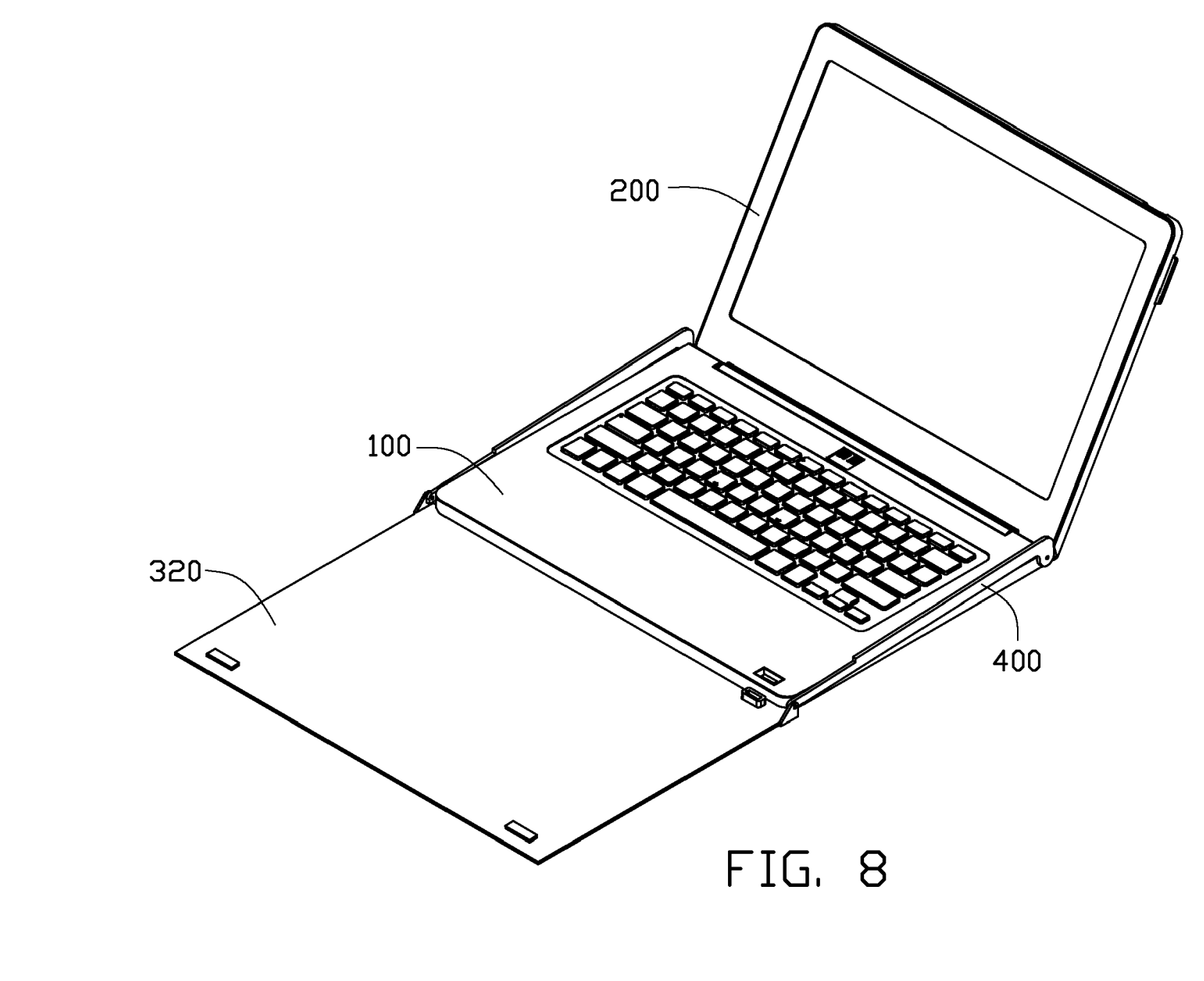
FIG. 8 is a schematic view of the portable electronic device in FIG. 1 with the writing tablet rotating away from the main body in a second direction reverse to the first direction.

To change the writing tablet 300 from the first position to the third position, a third external rotating force is applied on the side of the writing tablet 300 at the side of the second magnetic bodies 600, the writing tablet 300 rotates away from the two connecting rods 400 and the main body 100. The writing tablet 300 is arranged on the side of the front wall 107 away from the rear wall 109. The second surface 320 is above the first surface 310. The first side walls 110 are between the two connecting rods 400 and adjacent to the two connecting rods 400 correspondingly, i.e., the writing tablet 300 is in the third position.

Changing the writing tablet 300 from the second position to the first position is reverse of the above descriptions of changing the writing tablet 300 from the first position to the second position. Changing the writing tablet 300 from the third position to the first position, is reverse of the above descriptions of changing the writing tablet 300 from the first position to the third position.

It is to be understood, however, that even though numerous information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A portable electronic device comprising:
   a main body;
   a display pivotally connected to a rear wall of the main body to selectively locate in a first state and a second state, in the first state, the display covering a top wall of the main body; in the second state, the display being rotated away from the top wall;
   a writing tablet comprising a first surface for receiving input operations and a second surface opposite to the first surface, the writing tablet being pivotally connected to the main body to selectively locate at a first position and a second position; in the first position, the second surface of the writing tablet contacting and covering the top wall of the main body, and the writing tablet being electrically connected with the main body for receiving input signals; in the second position, the second surface of the writing tablet contacting and covering a front side of the display.

2. The portable electronic device according to claim 1, further comprising two connecting rods, each of which comprising one end pivotally connected to one of opposite sidewalls of the main body, respectively, and the other end pivotally connected to the writing tablet.

3. The portable electronic device according to claim 2, wherein two baffles protrude from the writing tablet, the two connecting rods are between the baffles.

4. The portable electronic device according to claim 1, wherein a jack is arranged in the main body, a plug is arranged on the second surface of the writing tablet, the plug is capable of being inserted into the jack and electrically connecting with the jack to electrically connect the writing tablet with the main body.

5. A portable electronic device comprising:
   a main body;
   a display pivotally connected to the main body;
   a writing tablet comprising a first surface for receiving input operations and a second surface opposite to the first surface; and
   at least one connecting rod pivotally connecting the writing tablet with the main body;
   wherein the writing tablet selectively locates in a first position and a second position, when the writing tablet is in the first position, the second surface of the writing tablet contacts and covers a top wall of the main body, and the writing tablet electrically connects with the main body for generating input signals based on received input operations and transmitting the input signals to the main body; when the writing tablet is in the second position, the second surface of the writing tablet contacts and covers a front side of the display.

6. The portable electronic device according to claim 5, wherein at least one first magnetic body is arranged on the writing tablet, the at least one second magnetic body is arranged in the display, when the writing tablet is in the second position, the at least one first magnetic body attracts the at least one second magnetic body correspondingly.

7. The portable electronic device according to claim 5, wherein a jack is arranged in the main body, a plug is arranged on the second surface of the writing tablet, when the writing tablet is in the first position, the plug is capable of being inserted into the jack and electrically connected with the jack to electrically connect the writing tablet with the main body.

8. The portable electronic device according to claim 7, wherein the display has a receiving portion, when the writing tablet is in the second position, the plug is received in the receiving portion.

9. The portable electronic device according to claim 5, wherein at least one protrusion is arranged on one side wall of the display, the at least one protrusion is capable of blocking the at least one connecting portion to rotate when the writing tablet is in the second position.

10. The portable electronic device according to claim 5, wherein the main body pivotally connects with one end of each of the at least one connecting rod, the writing tablet pivotally connects with the other end of each of the at least one connecting rod.

* * * * *